United States Patent
Mariotto

(10) Patent No.: US 10,250,102 B2
(45) Date of Patent: Apr. 2, 2019

(54) REVERSIBLE ELECTRICAL MACHINE FOR AN AIRCRAFT

(71) Applicant: AIRBUS HELICOPTERS, Marignane (FR)

(72) Inventor: Damien Mariotto, Lambesc (FR)

(73) Assignee: AIRBUS HELICOPTERS, Marignane (FR)

( * ) Notice: Subject to any disclaimer, the term of this patent is extended or adjusted under 35 U.S.C. 154(b) by 164 days.

(21) Appl. No.: 15/216,155

(22) Filed: Jul. 21, 2016

(65) Prior Publication Data
US 2016/0329777 A1    Nov. 10, 2016

Related U.S. Application Data

(63) Continuation of application No. 13/945,326, filed on Jul. 18, 2013, now Pat. No. 9,425,670.

(30) Foreign Application Priority Data

Jul. 19, 2012    (FR) .................................... 12 02056

(51) Int. Cl.
*B60L 1/02* (2006.01)
*F01K 15/00* (2006.01)
(Continued)

(52) U.S. Cl.
CPC ............ *H02K 7/1823* (2013.01); *B60L 11/12* (2013.01); *B64C 27/14* (2013.01); *B64D 27/24* (2013.01);
(Continued)

(58) Field of Classification Search
CPC .......... B60K 6/26; B60K 6/365; B60K 6/383; B60K 6/40; B60K 6/405; B60K 6/445;
(Continued)

(56) References Cited

U.S. PATENT DOCUMENTS 4,500,966 A * 2/1985 Zagranski ............. B64C 27/006
701/100
5,973,460 A    10/1999 Taga et al.
(Continued)

FOREIGN PATENT DOCUMENTS

DE     202008002249 U1    4/2008
EP         1324893 A1    7/2003
(Continued)

OTHER PUBLICATIONS

Search Report and Written Opinion; Application No. FR 1202056; dated Jul. 19, 2013.

*Primary Examiner* — Tulsidas C Patel
*Assistant Examiner* — Thomas K Quigley
(74) *Attorney, Agent, or Firm* — Brooks Kushman P.C.

(57) ABSTRACT

A reversible electrical machine (1) comprising: a first electrical device (10) having a first stator (11) and a first rotor (12); a second electrical device (20) including a second rotor (22) and a second stator (21) together with an outlet shaft (50) and first disengageable coupling means (30) enabling said first and second rotors (12, 22) to be associated and dissociated in rotation. Said reversible electrical machine (1) also includes second disengageable coupling means (40) that are disengageable under a predetermined force and that mechanically connect said second rotor (22) to said outlet shaft (50). Said first electrical device (10) is a motor for transmitting high mechanical power to said outlet shaft (50), while said second electrical device (20) is a motor-generator for operating in motor mode to transmit additional mechanical power to said outlet shaft (50), and in generator mode for receiving mechanical power from said outlet shaft (50).

20 Claims, 3 Drawing Sheets

(51) Int. Cl.
*H02K 7/18* (2006.01)
*H02K 7/00* (2006.01)
*H02K 7/108* (2006.01)
*H02K 16/00* (2006.01)
*H02K 16/02* (2006.01)
*B64C 27/14* (2006.01)
*B60L 11/12* (2006.01)
*B64D 27/24* (2006.01)
*B64D 35/02* (2006.01)
*B64D 27/02* (2006.01)

(52) U.S. Cl.
CPC ............. *B64D 35/02* (2013.01); *H02K 7/006* (2013.01); *H02K 7/108* (2013.01); *H02K 16/00* (2013.01); *H02K 16/02* (2013.01); *B60L 2200/10* (2013.01); *B60L 2220/42* (2013.01); *B64D 2027/026* (2013.01); *Y02E 20/16* (2013.01); *Y02T 10/641* (2013.01); *Y02T 10/646* (2013.01); *Y02T 10/7077* (2013.01); *Y02T 50/64* (2013.01)

(58) Field of Classification Search
CPC .......... B60K 6/448; H02K 7/006; H02K 7/09; H02K 7/108; H02K 7/1807
See application file for complete search history.

(56) References Cited

U.S. PATENT DOCUMENTS

| | | |
|---|---|---|
| 6,740,002 B1 | 5/2004 | Stridsberg |
| 6,936,933 B2 | 8/2005 | Wilmore |
| 8,226,513 B2 | 7/2012 | Abe |
| 9,425,670 B2 | 8/2016 | Mariotto |
| 2002/0036106 A1 | 3/2002 | Hanyu et al. |
| 2008/0106163 A1 | 5/2008 | Mizuno |
| 2011/0136607 A1 | 6/2011 | Samie et al. |
| 2011/0245003 A1 | 10/2011 | Takami |
| 2012/0035014 A1 | 2/2012 | Moeller |
| 2013/0126669 A1 | 5/2013 | Hamann |

FOREIGN PATENT DOCUMENTS

| | | |
|---|---|---|
| EP | 2206619 A1 | 7/2010 |
| EP | 2413483 A1 | 2/2012 |
| WO | 0228674 A1 | 4/2002 |
| WO | 2009028464 A1 | 3/2009 |
| WO | 2010109162 A2 | 9/2010 |

* cited by examiner

REVERSIBLE ELECTRICAL MACHINE FOR AN AIRCRAFT

CROSS REFERENCE TO RELATED APPLICATIONS

This application is a continuation of U.S. application Ser. No. 13/945,326, filed Jul. 18, 2013, which claims priority to French patent application No. FR 12 02056 filed on Jul. 19, 2012, the disclosure of which are incorporated in their entirety by reference herein.

BACKGROUND OF THE INVENTION (1) Field of the Invention

The present invention relates to the field of electrical machines. It relates to a reversible electrical machine, i.e. an electrical machine that may act as a motor or as a generator. The invention relates more particularly to a reversible electrical machine for a rotary wing aircraft, and also to a power plant for such an aircraft.

(2) Description of Related Art

An electrical machine is said to be "reversible" when it makes it possible both to transform electrical energy into mechanical energy and also to transform mechanical energy into electrical energy.

An electrical machine transforming electrical energy into mechanical energy is known as a motor. An electrical machine transforming mechanical energy into electrical energy is known as a generator. Among generators, it is possible to distinguish between alternators that deliver electricity in the form of alternating current (AC) and dynamos that deliver electricity in the form of direct current (DC).

Any electrical machine may be reversible, i.e. it may be both a motor and a generator, with the distinction between the motor and generator functions being determined solely relative to the purpose for which the electrical machine is used. The term "motor-generator" is also used if both of those functions are available from the electrical machine.

The motors commonly in use may be rotary, i.e. they produce angular movement and/or torque, or else they may be linear, i.e. they produce linear movement and/or force.

In contrast, generators are almost always rotary.

A rotary electrical machine is an electromechanical device having at least one stator that is stationary and at least one rotor that rotates relative to the stator. The rotation of the rotor is generated by the interaction between two magnetic fields attached respectively to the stator and to the rotor, thereby creating a magnetic torque on the rotor. The terms "stator magnetic field" and "rotor magnetic field" may then be used.

The description below is restricted to rotary electrical machines, so the term "electrical machine" is used instead of "rotary electrical machine" for short. Likewise, the term "electrical machine" designates a rotary electrical motor, and the term "generator" designates a rotary electrical generator.

The various technologies used for electrical machines differ essentially in the way in which these stator and rotor magnetic fields are generated.

For example, in a DC electric motor, the stator has magnetic elements that may be permanent magnets or that may be non-permanent magnets, more commonly referred to as electromagnets, and generally constituted by windings of electrical conductors, such as one or more coils powered with DC. Either way, a steady stator magnetic field is thus created. In contrast, the rotor has non-permanent magnets constituted by a set of coils creating a rotor magnetic field when they carry DC. During rotation of the rotor, a rotary commutator serves to reverse the direction of DC flow through the coils of the rotor at least once per revolution, thereby changing the direction of the rotor magnetic field.

Thus, an offset between the stator and rotor magnetic fields gives rise to magnetic torque on the rotor, for example with a north pole of the stator repelling a north pole of the rotor and attracting a south pole of the rotor. Consequently, the rotor is caused to rotate relative to the stator.

A main drawback of such a DC electrical machine lies in the electrical contacts needed between the rotor coils and the rotary commutator. These contacts, e.g. obtained by brushes, can give rise to electric arcs leading in particular to wear and to interference, and consequently requiring maintenance to be performed on the electrical machine more frequently. In addition, electric motors of that type are not suitable for high speeds of rotation and they consume energy in friction, thereby degrading efficiency. Finally, they can be complex to make.

That drawback has been eliminated by so-called "brushless" motor technology.

The rotor of such a motor has one or more permanent magnets, while the stator has a plurality of coils constituting non-permanent magnets. Such a motor may also have means for determining the position of the rotor, e.g. by using a sensor, together with an electronic control system for switching electric current. AC is then passed through the various stator coils. The electronic control system thus serves to determine the orientation and the direction of the stator magnetic field relative to the rotor magnetic field and consequently causes the rotor to rotate relative to the stator, with a rotary stator field pulling the rotor field into synchronization.

Furthermore, one or more coils of the stator may be grouped together in order to form different phases of the stator, each phase having the same offset relative to the other phases. Each phase thus generates a stator magnetic field, each stator magnetic field being likewise offset relative to the other stator magnetic field.

Among AC electrical machines, a distinction may be drawn between electrical machines that are synchronous and those that are asynchronous.

Synchronous electrical machines, a category in which brushless motors belong, have a rotor with one or more permanent magnets and a stator with one or more coils, thus serving to form one or more phases. When they convey one or more phases of AC, the coils of the stator create one or more rotating stator magnetic fields that pull the rotor magnetic field into synchronization with the synchronous frequency of the machine, and consequently entrain rotation of the rotor.

Conversely, rotation of the rotor, e.g. generated by external mechanical power, creates a rotating rotor magnetic field, thereby causing one or more rotating stator magnetic fields to be created, and consequently causing one or more AC phases to appear and flow in the coils of the stator.

The permanent magnets of the rotor may be replaced by DC-powered coils, thereby constituting non-permanent magnets, and thus creating an equivalent rotor magnetic field. The DC may be delivered by a source of electricity, such as a battery or a capacitor.

The frequency of rotation of the rotor of a synchronous electric motor is proportional to the frequency of the AC applied to the stator. Likewise, the frequency of the AC generated by a synchronous electric generator is proportional to the frequency of rotation of the rotor. A synchronous machine is often used as a generator, e.g. as an alternator in power stations.

Asynchronous electrical machines have a rotor with one or more short-circuited coils and a stator having a plurality of coils constituting non-permanent magnets. When the coils of the stator carry AC, they create one or more rotating stator magnetic fields that cause rotor electric current to appear in the rotor coils, thereby generating magnetic torque on the rotor, and consequently causing the rotor to rotate relative to the stator.

Conversely, rotation of the rotor as generated by external mechanical power will lead to the appearance of AC flowing in the coils of the stator. For this purpose, it is necessary to connect the electrical machine to an electricity network, e.g. including at least one converter and a battery, in order to supply it with the reactive energy needed to enable it to operate in generator mode.

Although the frequency of rotation of the stator magnetic field is proportional to the frequency of the AC carried by the coils of the stator, the frequency of the rotation of the rotor of an asynchronous electric motor is not necessarily proportional to this frequency of the AC, and a slip speed may appear between the rotor and the stator magnetic field. Likewise, the frequency of the AC generated in an asynchronous electric generator is not necessarily proportional to the frequency of rotation of the rotor.

For a long time, asynchronous machines were used only as electric motors, e.g. in transport for propelling ships and trains, and also in industry for machine tools. By using power electronics, such electrical machines can nowadays also be used as electricity generators, e.g. in wind turbines.

Whatever the type of reversible electrical machine, the permanent or non-permanent magnets may be oriented either radially or else axially relative to the axis of rotation of the electrical machine. These various orientations of the magnets enable the magnetic flux flowing in the electrical machine to be oriented either radially or axially. On a given machine, it is also possible to use some magnets that are oriented radially and others that are oriented axially.

Electrical machines having permanent magnets on the rotor provide greater performance because of their high efficiencies in motor mode, making it possible to have high power per unit weight and because of the high level of magnetic torque that is generated on the rotor by the permanent magnets. Furthermore, since they do not make use of brushes, friction is kept down, thereby contributing to improving the performance of such electrical machines, in particular at high speeds of use, and also contributing to reducing the frequency with which maintenance is required.

In contrast, in an electrical machine that is reversible, in order to have maximum efficiency, the mechanical power delivered by the rotor in motor mode must be equal to the electrical power that can be generated on the stator in generator mode. If all of the power in generator mode is not used, that leads to high levels of losses by the Joule effect and to a degradation in terms of efficiency and in terms of the power per unit weight of the machine, in particular because of the need to add a large system for dissipating the heat generated by the Joule effect.

Furthermore, a short circuit on one or more coils of the stator, and consequently on one or more phases of the stator, can give rise to a high level of opposing torque that can lead to a rapid loss in the speed of rotation of a reversible electrical machine. This braking of the rotation of the electrical machine can have severe consequences, e.g. on a transmission member that is mechanically coupled to the outlet shaft of the electrical machine. Finally, during rotation of the rotor, a short circuit on one or more coils of the stator can give rise to high induced currents in each short-circuited coil, and that can lead to local heating of the coil that might cause a fire.

Although reversible, that type of electrical machine therefore does not make it possible to achieve performance levels that are equivalent both in motor mode and in generator mode if there is unbalance in terms of demand between those two modes. Consequently, a sufficiently high safety level is not achievable for incorporating such a reversible electrical machine with permanent magnets in a rotary wing aircraft, for example.

Electrical machines with coils in the rotor make it possible to eliminate those drawbacks, i.e. the resisting torque that breaks the rotor and the risk of fire due to a short circuit in one or more coils of the stator. Such electrical machines have performance levels that are equivalent in motor mode and in generator mode and they enable the currents that are applied to the coils of the rotor in generator mode to be adjusted. Nevertheless, such electrical machines present lower performance in motor mode than can be achieved in machines using permanent magnets. In order to obtain a level of performance that is equivalent to an electrical machine having permanent magnets, in particular in terms of torque in motor mode, such electrical machines would need to be of larger dimensions, i.e. they need to have volume and weight that are greater.

Furthermore, the use of such reversible electrical machines on board vehicles, and in particular on board rotary wing aircraft, is being developed in order to provide hybrid power plants that make use of two types of energy: both heat energy from fuel and electrical energy. Nevertheless, various constraints of such electrical machines limit their applications.

A distinction may be drawn in particular between two types of hybrid power plant used on rotary wing aircraft. Firstly, there is parallel hybridization in which an electric motor is connected to the main rotor of the aircraft, e.g. via a main gearbox (MGB), in order to deliver mechanical power to the main rotor and in order to recover mechanical power from the rotor, in particular during very specific stages of flight. There is also micro-hybridization in which an electric motor is connected to a turboshaft engine via a compressor of the engine, e.g. in order to deliver mechanical power to the engine and in order to recover mechanical power from the engine during specific stages of operation, other than starting the engine.

Firstly, for a rotary wing aircraft, the reversible electrical machine may be connected mechanically to the MGB or to the compressor of a turboshaft engine, and the torque requirement of the electrical machine in motor mode is large. However, as mentioned above, this torque requirement is prejudicial to the performance of such an electrical machine in generator mode since the electrical power demand in generator mode is much less than the mechanical power demand in motor mode, or else it is necessary to use electrical machines that are heavy and bulky, and in particular that include large cooling systems. It is also possible to use two electrical machines, a first electrical machine that performs the motor function only and a second electrical machine that performs the generator function.

Furthermore, in the event of a short circuit on at least one coil of one of those electrical machines, high levels of damage can be generated, in particular in the MGB of the aircraft and in the environment surrounding the electrical machine. In order to avoid such damage, one solution is to use a fuse section of small diameter on the connection between the electrical machine and the MGB, for example. However the dimensioning of that section is such that its breaking torque must be less than the resisting torque from the electrical machine as generated in the event of a short circuit and greater than the torque from the electrical machine when operating in motor mode. The energy needed for breaking that fuse section is therefore very high. Consequently, such a fuse section is difficult to install, since the resisting torque from the electrical machine and the torque delivered by the electrical machine in motor mode may be equivalent. It is nevertheless possible to overdimension the electrical machine so as to have a resisting torque from the electrical machine in the event of a short circuit on at least one coil that is greater than the torque delivered by the electrical machine in motor mode. However, such a machine then has dimensions and weight that are not favorable for use on board a rotary wing aircraft.

Another known solution is to use a disengageable connection such as a freewheel or overrunning clutch between the electrical machine and the MGB. That type of connection makes it possible to avoid damaging the MGB in the event of such a short circuit, but it prevents the electrical machine from being used in reversible manner, thereby losing its generator function.

Document EP 1 324 893 described an electrical machine having two electrical assemblies, each having a rotor and a stator together with a freewheel between the two rotors. In addition, a first assembly of that electrical machine may be connected via the first rotor to the transmission shaft of an engine of a self-propelled vehicle, while the second assembly may be connected via the second rotor to a clutch that is connected to the gearbox of the vehicle. The freewheel thus serves to associate the two rotors in one direction of rotation and to dissociate them in the opposite direction.

The first electrical assembly is capable of starting the engine. When the engine is driving the gearbox, both electrical assemblies are also driven by the engine via the freewheel. They can then operate in generator mode in order to deliver electricity. In electrical propulsion mode, the engine is stopped and the second electrical assembly acts on its own to drive the gearbox, the freewheel ensuring that the second electrical assembly and the engine are not driven by the second electrical assembly. Finally, e.g. when descending, the freewheel ensures dissociation between the first and second rotors, it being possible for the engine then to be idling. The first electrical assembly can then be used as a generator, with the second electrical assembly being used either as a generator or else as a brake.

BRIEF SUMMARY OF THE INVENTION

An object of the present invention is thus to propose a reversible electrical machine that makes it possible to eliminate the above-mentioned drawbacks and that is capable firstly of driving a main rotor of an aircraft in rotation, e.g. via its MGB, and secondly of transforming some of the mechanical energy from the main rotor into electrical energy.

The reversible electrical machine of the invention may also serve to drive rotation of a compressor of a turboshaft engine of an aircraft and to transform a fraction of the mechanical energy from the compressor into electrical energy.

According to the invention, a reversible electrical machine comprises a first electrical device with a first rotor co-operating with a first stator, a second electrical device having a second rotor co-operating with a second stator, an outlet shaft, and first disengageable coupling means enabling the first and second rotors of the electrical devices to be associated and dissociated in rotation.

The reversible electrical machine may be installed in a rotary wing aircraft, it then being possible to connect the outlet shaft of the reversible electrical machine to the MGB of the aircraft or else to the compressor of a turboshaft engine of the aircraft.

The reversible electrical machine is remarkable in that it also includes a second coupling means mechanically connecting the second rotor to the outlet shaft of the reversible electrical machine. The second coupling means are disengageable under a first predetermined force.

The first electrical device is a motor and the second electrical device is a motor-generator. The first electrical device operates in motor mode only, in order to transmit a high level of mechanical power to the outlet shaft, whereas the second electrical device is equally capable of operating both in motor mode in order to transmit additional mechanical power to the outlet shaft and also in generator mode, the outlet shaft then transmitting mechanical power to the second electrical device.

The use of first disengageable coupling means between the first and second rotors makes it possible to have this remarkable operation for the two electrical devices.

Thus, when the first device is performing its motor function, the first coupling means are engaged so that the first rotor transmits high mechanical power to the outlet shaft of the reversible electrical machine, possibly via the second rotor. Furthermore, the second rotor may deliver additional mechanical power to the outlet shaft via the second coupling means, the second electrical device then likewise operating in motor mode. Under such circumstances, the reversible electrical machine of the invention uses the outlet shaft to deliver a maximum level of mechanical power.

In contrast, when the outlet shaft receives mechanical power, e.g. from the MGB of an aircraft, this mechanical power is then transmitted to the second rotor via the second coupling means. The second electrical device is then in generator mode and it transforms this mechanical power into electrical power. The first coupling means is then disengaged so as to dissociate the second electrical device from the first electrical device. In this way, no resisting torque is transmitted by the first electrical device to the second electrical device. The efficiency with which the mechanical power is transformed into electrical power is thus optimized.

Furthermore, for example in the context of parallel hybridization, the power of the reversible electrical machine in motor mode is much greater than in generator mode. The need for mechanical power in a rotary wing aircraft, for example, is large in order to drive an MGB and consequently drive the main rotor of the aircraft. However, in generator mode, the need for electrical power as generated by the reversible electrical machine, e.g. for powering electrical equipment on board the aircraft or for recharging electrical energy storage means, is lower.

Likewise, with micro-hybridization, the power of the reversible electrical machine in motor mode is much greater than in generator mode. The need for mechanical power for driving the turboshaft engine is large. In contrast, in generator mode, the need for electrical power generated by the reversible electrical machine in order to power electrical equipment on board an aircraft or else to recharge electrical energy storage means is lower.

For example, with parallel hybridization, the power of the reversible electrical machine in generator mode represents 10% of its power in motor mode. Thus, the first electrical device operating solely in motor mode can be dimensioned to deliver 90% of the total power required from the reversible electrical machine in motor mode, whereas the second electrical device operating in generator mode and in motor mode can be dimensioned so as to deliver 10% of this total power in motor mode.

Furthermore, in the event of a resisting torque appearing in the first electrical device, e.g. as a result of a short circuit in at least one electrical conductor wire winding, such as a coil, of the first stator of this first electrical device, the first coupling means are disengaged. Thus, the first rotor no longer rotates relative to the first stator, and consequently no induced current flows in that winding of the first stator, and as a result no sudden rise in temperature appears within the first electrical device. Furthermore, such braking of the first rotor of the first electrical device is not transmitted to the second electrical device, nor is it transmitted to the outlet shaft. Consequently, this braking of the first electrical device does not lead to harmful consequences in the elements that are connected to the outlet shaft, such as the MGB of an aircraft. Furthermore, the reversible electrical machine may continue to operate, both in motor mode and in generator mode by using the second electrical device.

Likewise, in the event of the second electrical device braking, e.g. as a result of a short circuit in at least one electrical conductor wire winding such as a coil of the second electrical device, the second coupling means can be disengaged so that the braking of the second electrical device is not transmitted to the outlet shaft. As a result, this braking of the second electrical device does not give rise to degradation in elements that are connected to the second outlet shaft.

Preferably, the disengagement of the second coupling means is performed automatically, as from a first predetermined force. The second coupling means transmit firstly torque delivered to the outlet shaft by the second electrical device in motor mode, possibly associated with the first electrical device in motor mode, and secondly the torque delivered by the outlet shaft to the second electrical device in generator mode. It is therefore possible to determine a maximum level of torque that is to be transmitted by the second coupling means.

Thus, the first predetermined effort from which the second coupling means are to be disengaged needs to be greater than the maximum torque that it needs to transmit and less than the braking torque from the second electrical device.

The second coupling means may comprise a fuse element rotatably connecting the outlet shaft with a bore associated with the second rotor and in which the outlet shaft is positioned. The fuse element is defined to break under the first predetermined force so as to dissociate the bore from the outlet shaft, and consequently the second rotor from the outlet shaft.

As a result, the second coupling means are simple to design, to install, and to replace after breaking. Consequently, the second coupling means constitutes a solution that is inexpensive and reliable. For example, the fuse element may be a pin or a key.

Each stator of the reversible electrical machine of the invention has one or more conductor wire windings, such as coils, representing one or more phases of the stator in order to generate the first and second stator magnetic fields needed respectively for the operation of the first and second electrical devices. However, several solutions are possible on each rotor in the reversible electrical machine for generating the first and second rotor magnetic fields.

In one embodiment of the invention, the first rotor has permanent first magnets. Electrical machines with permanent magnets present greater performance because of the permanent torque generated by the permanent magnets on the rotor making it possible for losses to be small and thus for efficiency to be high. Since the first magnets are permanent, no energy needs to be provided in order to create the corresponding rotor magnetic field, and consequently Joule effect losses are low.

Furthermore, the use of the first disengageable coupling means enables the reversible electrical machine in generator mode to present efficiency that is optimized for the machine and thus to maximize power per unit weight, since Joule effect loses are minimized. The use of cooling means, which may be quite heavy, can therefore be limited or even be unnecessary.

Nevertheless, the first rotor may also include non-permanent first magnets instead of permanent magnets. These non-permanent magnets may for example be constituted by one or more electrical conductor windings such as coils. DC then needs to be fed to these coils in order to create the first rotor magnetic field. The DC may be delivered from one or more electricity sources, such as a battery or a capacitor, that are present in the vehicle in which the reversible electrical machine is installed.

In contrast, the first electrical device with a first rotor having non-permanent first magnets provides lower performance since it accepts greater losses, in particular by the Joule effect, e.g. as a result of the rotor magnetic field being created by the non-permanent first magnets, thus leading to efficiency that is lower than that of an electrical device having the same dimensions and a rotor with permanent magnets. In order to have the same torque, the first electrical device with a first rotor having non-permanent magnets needs to be of larger dimensions and consequently of greater weight.

Furthermore, in order to maximize the torque delivered by the first electrical device in motor mode, the first magnets of the first rotor, whether permanent or non-permanent, rotate outside the first stator. As a result, the magnetic torque of the rotor is greater than if the magnets were placed inside the stator, and consequently the torque delivered by the first electrical device in motor mode is increased.

Likewise, the second rotor may have permanent second magnets. These second magnets of the second rotor rotate inside the second stator, so the magnetic torque of the rotor is smaller than it would be if the magnets were placed outside the stator, and consequently, the magnetic torque effect generated by these permanent magnets in generator mode and thus the electrical power and the mechanical power that are produced are smaller.

In order to minimize this magnetic torque, the second rotor may also have second magnets that are non-permanent instead of permanent magnets.

Nevertheless, the use of non-permanent magnets on the rotor makes it possible by varying the current flowing in the rotor coils, firstly to eliminate the rotor magnetic field, which is not possible in permanent magnetic devices, and consequently to eliminate the resisting torque in the event of a short circuit in a coil of the stator, and secondly to adjust the rotor magnetic field to match real requirements and thus to have smaller losses in generator mode.

It is also possible to use both permanent magnets and non-permanent magnets within a single reversible electrical machine. For example, permanent first magnets may be used with the first rotor, while non-permanent second magnets are used with the second rotor.

In an embodiment of the invention, the first magnets of the first rotor rotate outside the first stator and the second magnets of the second rotor rotate inside the second stator. It is then possible to group together the first and second stators so that they form a single stator having one or more electrical conductor windings forming one or more phases of the stator with which the first and second rotors co-operate. Advantageously, the reversible electrical machine has only one stator, which may be of small dimensions and weight. Furthermore, in order to rotate about the same stator, the first and second rotors must also rotate about the same axis of rotation. Finally, using one or more electrical conductor windings on a single stator makes it possible to reduce the cost of the reversible electrical machine and to reduce the amount of maintenance it requires, while also increasing its reliability.

In a preferred embodiment of the invention, the first rotor and the second rotor rotate respectively outside and inside a single stator. Furthermore, the first magnets of the first rotor and the second magnets of the second rotor are permanent magnets.

The first coupling means then comprise an intermediate shaft and third disengageable coupling means mechanically connecting together the first rotor and the intermediate shaft. The intermediate shaft is associated with the outlet shaft of the reversible electrical machine such that the first rotor is mechanically connected to the outlet shaft via the third coupling means and intermediate shaft.

Furthermore, the first coupling means also include the second coupling means of the reversible electrical machine. As a result, this first rotor is mechanically connected to the second rotor via the second and third coupling means, the intermediate shaft, and the outlet shaft.

This intermediate shaft may also be constituted by one end of the outlet shaft. Under such circumstances, the third disengageable coupling means mechanically connect together the first rotor and the outlet shaft.

As a result, when the third coupling means are engaged, the first rotor is mechanically connected to the intermediate shaft, which is itself mechanically connected to the second rotor via the outlet shaft and the second coupling means, which are likewise engaged. Thus, the first rotor is associated with the second rotor.

Conversely, when the second coupling means are disengaged, the first rotor is no longer mechanically connected to the intermediate shaft, and consequently it is dissociated from the second rotor.

In order to enable the above-mentioned first coupling means to operate, the third coupling means are engaged while the reversible electrical machine is operating in motor mode, and they are disengaged while the electrical machine is operating in generator mode.

Thus, in the event of the first electrical device braking, the first coupling means are disengaged and the braking of the first electrical device is transmitted neither to the intermediate shaft, nor to the outlet shaft, nor to the second electrical device. Consequently, this braking of the first electrical device does not lead to damage to the elements connected to the outlet shaft. Furthermore, the reversible electrical machine may continue to operate in motor mode or indeed in generator mode via the second electrical device.

In the event of the second electrical device braking, the second coupling means must be disengaged so that the braking of the second electrical device is not transmitted to the outlet shaft. This ensures that such blocking of the second electrical device does not lead to damage to the elements connected to said outlet shaft.

Advantageously, the first device is then always mechanically connected to the outlet shaft via the third coupling means and the intermediate shaft. Thus, in this preferred embodiment, reversible electrical machine can continue to operate in motor mode only via the first electrical device.

The second coupling means are disengaged automatically as from a first predetermined force. In this preferred embodiment, the first rotor is directly connected to the outlet shaft via the third coupling means and intermediate shaft, and the torque from the first device in motor mode is not transmitted to the second coupling means. The second coupling means transmit firstly the torque delivered to the outlet shaft solely by the second electrical device in motor mode, and secondly the torque delivered by the outlet shaft to the second electrical device.

Advantageously, since the second coupling means do not transmit torque from the first electrical device in motor mode, the first predetermined force for disengagement of the second coupling means can be small. Consequently, the dimensions of the second coupling means can also be small.

For example, if the driving torque from the second electrical device represents 10% of the torque from the first electrical device in motor mode, the first predetermined force of the second coupling means may be reduced by 90% in this preferred embodiment compared with an embodiment in which the second coupling means transmits all of the torque from the reversible electrical machine in motor mode.

By way of example, the third coupling means may be a freewheel enabling the first rotor to be associated with the intermediate shaft, and consequently with the outlet shaft and with the second rotor in one direction of rotation, and for it to be dissociated from the outlet shaft, and consequently from the second rotor, in the opposite direction of rotation, the second coupling means being engaged in both circumstances.

Furthermore, the use of a freewheel, which constitutes disengageable coupling means that are simple, reliable, and inexpensive, makes it possible for reversible electrical machines to be made that are likewise reliable and of low cost.

The reversible electrical machine as obtained in this way makes it possible to obtain operation in motor mode with a high level of torque, while minimizing the magnetic torque in generator mode. Furthermore, this reversible electrical machine is relatively compact because it uses only one stator, and because it uses second and third coupling means that are simple. Finally, these elements make it possible to obtain a reversible electrical machine at low cost, with optimized reliability, and low maintenance.

In an embodiment of the invention, the reversible electrical machine has only one stator. The first rotor is made up of non-permanent first magnets, such as DC-powered coils, and it rotates outside the stator, while the second rotor is made up of non-permanent second magnets, such as DC-powered coils, and it rotates inside the stator. In addition, the non-permanent first and second magnets are mechanically connected in rotation about the common axis of rotation of the first and second rotors.

The DC powering the non-permanent first and second outlet shafts may be delivered by an electricity source that is present in the vehicle in which the reversible electrical machine is installed.

Thus, when the non-permanent first and second magnets are powered with DC, the magnetic field of the first and second rotors are pulled into synchronization by the rotating stator magnetic field, and consequently the first and second rotors rotate together about the axis of rotation of the electrical machine. However, in generator mode, when only the non-permanent second magnets are powered with DC, only the second magnetic field of the second rotor creates a rotating magnetic field and induces current in the stator, and consequently generates just sufficient electricity in generator mode.

The first coupling means may have inhibit means enabling the electrical power supply to the non-permanent first magnets to be switched off, while allowing the non-permanent second magnets to continue to be powered. Thus, the first coupling means are engaged when the non-permanent first magnets are electrically powered in order to transmit torque to the first rotor and to the second rotor in motor mode, whereas the first coupling means are disengaged when the inhibit means switches off the electrical power supply to the non-permanent first magnets so as to keep electricity requirements down to the amount that is strictly necessary in generator mode, and consequently they suffer fewer losses.

As a result, the electrical machine transmits maximum torque in motor mode when the first and second magnets are electrically powered, whereas the electrical machine transmits minimum torque in generator mode when the inhibit means switches off the electrical power supply to the first magnets, thereby optimizing the efficiency of the reversible electrical machine.

The non-permanent first and second magnets may be permanently mechanically connected together in rotation about the common axis of rotation of the first and second rotors. When the second coupling means are disengaged, e.g. as a result of the first or the second electrical device becoming blocked, the first and second rotors are dissociated from the outlet shaft of the reversible electrical machine and cease to operate, whether in motor mode or in generator mode.

In a variant of this embodiment of the invention, the first coupling means also include the second coupling means and fourth coupling means. As a result, the non-permanent first and second magnets can be connected together mechanically in rotation about the common axis of rotation of the first and second rotors by means of these second and fourth coupling means and the outlet shaft.

The fourth coupling means may be disengageable under a second predetermined force, enabling the first rotor to be dissociated from the outlet shaft in the event of the first electrical device becoming blocked. Thus, the electrical machine remains operational via the second device, which is connected to the outlet shaft via the second coupling means.

The fourth coupling means may include a fuse element, such as a pin or a key that serves for example to constrain in rotation the outlet shaft with a bore that is associated with the first rotor and in which the outlet shaft is positioned. This fuse element is defined to break under the second predetermined force in order to dissociate the bore from the outlet shaft, and consequently to dissociate the first rotor from the magnet.

Likewise, in the event of the second electrical device becoming blocked, since the second coupling means are disengageable under the first predetermined force it is possible to dissociate the second rotor from the outlet shaft. Thus, the electrical machine remains operational, in motor mode only, via the first device which is connected to the outlet shaft by the fourth coupling means.

Advantageously, in the event of the first or second electrical device becoming blocked, this variant thus makes it possible to maintain at least some of the functions of the reversible electrical machine.

Furthermore, the first predetermined force must be greater than the maximum torque transmitted by the second electrical device and less than the braking torque of said second electrical device.

Likewise, the second predetermined force must be greater than the maximum torque transmitted by the first electrical device and less than the braking torque from said first electrical device.

Thus, the first and second predetermined forces are independent of each other, and in this variant they can be optimized in order to reduce the dimensions and the weight of the reversible electrical machine.

Whatever the embodiment of the invention, the permanent or non-permanent magnets may be oriented radially or indeed axially relative to the axis of rotation of the electrical machine. These various orientations for the magnets serve to orient the magnetic flux flowing in the electrical machine, which flux is then radial or axial. It is also possible in a single electrical machine to use both magnets that are oriented radially and other magnets that are oriented axially.

Furthermore, the reversible electrical machine of the invention may be used in various types of vehicle. The reversible electrical machine is preferably used in a rotary wing aircraft. Such an aircraft has a hybrid power plant and at least one main rotor.

The hybrid power plant has at least one engine, at least one reversible electrical machine as described above, and an MGB. With parallel hybridization, the outlet shaft of the reversible electrical machine may be mechanically connected to the MGB, which is itself connected to the main rotor of the aircraft. For micro-hybridization, the outlet shaft of the reversible electrical machine may be mechanically connected to the compressor of a turboshaft engine constituting the engine.

BRIEF DESCRIPTION OF THE SEVERAL VIEWS OF THE DRAWINGS

The invention and its advantages appear in greater detail from the context of the following description of embodiments given by way of illustration and with reference to the accompanying figures in which.

Elements that are present in more than one of the figures are given the same references in each of them.

DETAILED DESCRIPTION OF THE INVENTION

Figure 1:
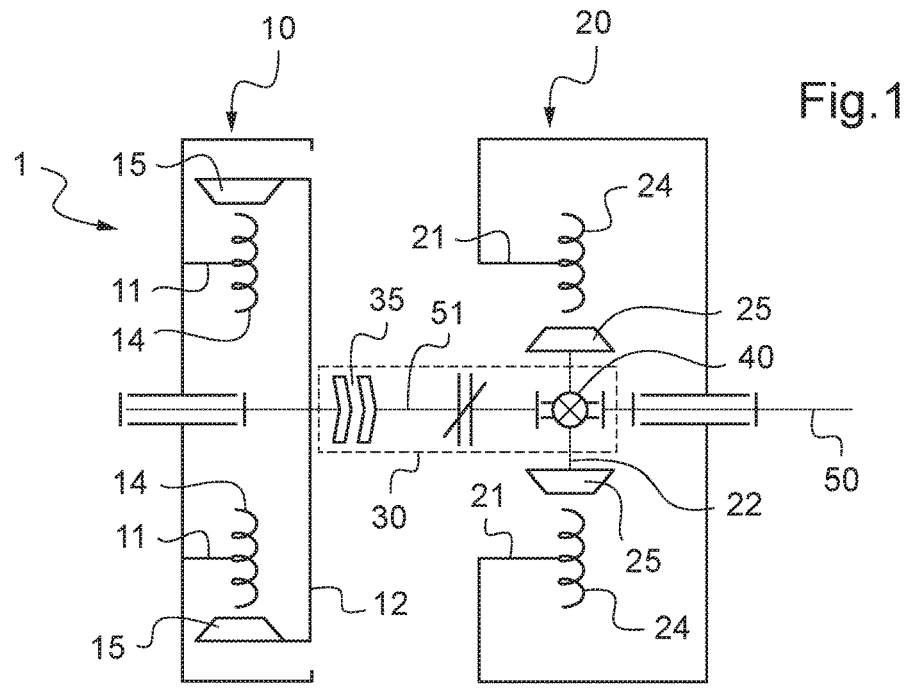
FIGS. 1 to 5 show various embodiments of the reversible electrical machine of the invention.

FIG. 1 shows an embodiment of a reversible electrical machine 1 of the invention having a first electrical device 10, a second electrical device 20, first disengageable coupling means 30, and an outlet shaft 50. The first device 10 is a motor and has a first rotor 12 co-operating with a first stator 11. Likewise, the second device 20 has a second rotor 22 co-operating with a second stator 21, however this second device is a motor-generator. Each stator 11, 21 is provided with non-permanent magnets 14, 24 made up of one or more windings of conductor wires serving to generate at least one stator magnetic field when passing an electric current. Each rotor 12, 22 is provided with permanent magnets 15, 25 generating respective first and second rotor magnetic fields.

In FIG. 1, as in all of the figures, the non-permanent magnets 14, 24 and the permanent magnets 15, 25 are oriented radially relative to the axis of rotation of each rotor 12, 22, thus enabling the magnetic flux to flow radially between the non-permanent magnets 14, 24 of the stators 11, 21 and the permanent magnets 15, 25 of the rotors 12, 22.

Nevertheless magnets 14, 24, 15, 25 may also be oriented axially relative to the axis of rotation of each rotor 12, 22, the magnetic flux then flowing axially between the magnets 14, 24 and 15, 25.

In a reversible electrical machine 1, it is also possible to arrange some of these magnets 14, 24 axially and others of these magnets 14, 24 radially relative to the axis of rotation of each rotor 12, 22. Likewise, some of the magnets 15, 25 will then be oriented axially and others of the magnets 15, 25 will be oriented radially.

Furthermore, the non-permanent magnets 14, 24 of each stator 11, 21 may be made up of one or more windings of conductor wires forming one or more phases, respectively, which may then generate one or more stator magnetic fields, respectively.

The first disengageable coupling means 30 serve to connect the first and second rotors 12 and 22 together mechanically. Second disengageable coupling means 40 that are disengageable under a first predetermined force serve to connect the second rotor 22 mechanically with the outlet shaft 50. This outlet shaft may be connected to the power train of a vehicle, e.g. the MGB of a rotary wing aircraft.

The first rotor 12 rotates outside the second stator 11, while the second rotor 22 rotates inside the second stator 21, the first rotor 12 and the second rotor 22 having the same axis of rotation. As a result, the first electrical device 10 is capable of delivering a high level of mechanical torque in motor mode, while the second electrical device is capable of delivering lower mechanical torque in motor mode and low magnetic torque in generator mode.

The reversible electrical machine 1 may operate equally well in motor mode, in which the reversible electrical machine 1 transforms the electrical power it receives into mechanical power that is delivered to the outlet shaft 50, and also in generator mode, in which the outlet shaft 50 delivers mechanical power that the reversible electrical machine 1 transforms into electric power.

The first coupling means 30 comprise an intermediate shaft 51, the second coupling means 40, and third disengageable coupling means 35. The intermediate shaft 51 is secured to the outlet shaft 50, and the third coupling means 35 connect the first rotor 12 mechanically to the intermediate shaft 51. As a result, the first rotor 12 is mechanically connected to the outlet shaft 50, while the third coupling means 35 is engaged, thereby enabling the first rotor 12 to be mechanically connected to the second rotor 22 by the second coupling means 40 that are disengageable under a first predetermined force.

The third coupling means 35 include a freewheel enabling the first rotor 12 to be associated with the intermediate shaft 51 and consequently to the second rotor 22 in one direction of rotation, and to be disassociated from the intermediate shaft 51 and consequently the second rotor 22 in the opposite direction of rotation, the second coupling means 40 being engaged.

The first disengageable coupling means 30 thus enable the first rotor 12 to drive the outlet shaft 50 in rotation when the first device 10 is in motor mode. While the reversible electrical machine 1 is in motor mode, the second electrical device 20 may also be in motor mode and may deliver additional mechanical power to the outlet shaft 50.

Conversely, when the reversible electrical machine 1 is operating in generator mode, the second device 20 receives mechanical power from the outlet shaft 50 via the second coupling means 40 and consequently from the second rotor 22. Advantageously, the third coupling means 35 are disengaged in this mode of operation, and consequently the first coupling means 30 are likewise disengaged. The first electrical device 10 is then dissociated from the outlet shaft 50, and consequently from the second electrical device 20 and therefore does not operate in generator mode. Consequently, no resisting torque due to the permanent magnets 15 of the first rotor 11 appears in the reversible electrical machine 1. Consequently, the efficiency with which the mechanical energy from the outlet shaft 50 is transformed into electrical energy is optimized.

Figure 2:
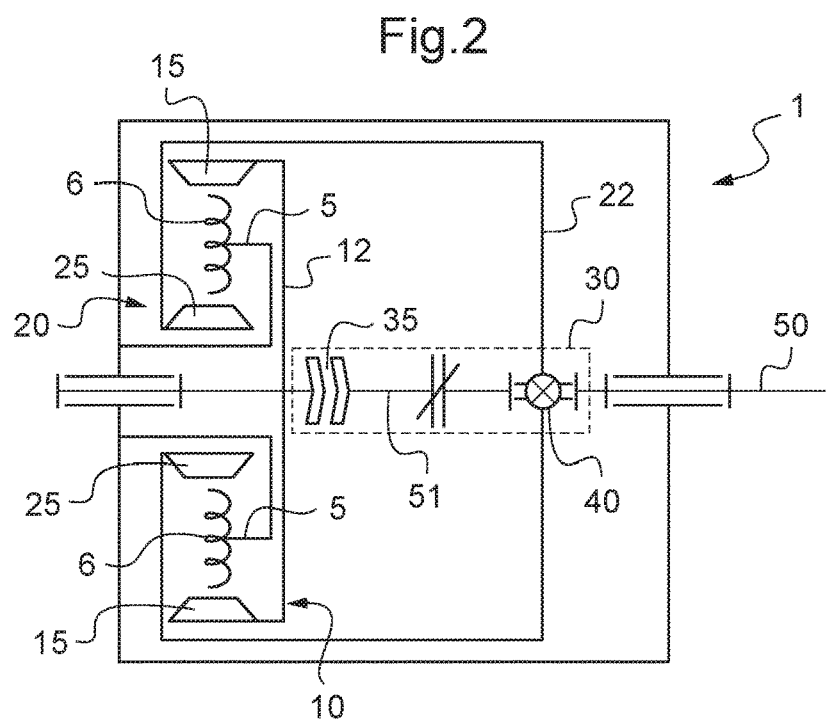

FIG. 2 shows a preferred embodiment of the electrical machine 1 that has only one stator 5, replacing the first and second stators 11, 21 of FIG. 1, while the first coupling means 30, the second coupling means 40, and the outlet shaft 50 remain unchanged compared with the embodiment shown in FIG. 1. The single stator 5 is provided with one or more windings 6 of conductor wires enabling at least one stator magnetic field to be generated when carrying an electric current. The first rotor 12 and the second rotor 22 rotate respectively outside and inside the stator 5, the first rotor 12 and the second rotor 22 having the same axis of rotation. Each rotor 12, 22 has permanent magnets 15, 25 generating respective first and second rotor magnetic fields.

Advantageously, the use of a single stator 5 for co-operating with both the first and the second rotors 12 and 22 enables the dimensions and the weight of the electrical machine to be reduced, and also enables its cost to be reduced.

Figure 3:
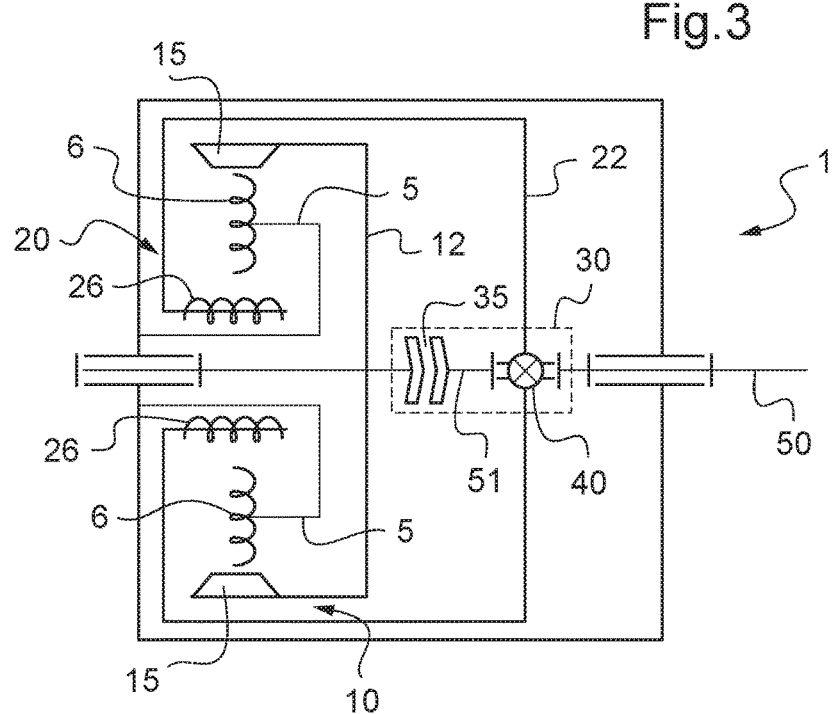

FIG. 3 shows another embodiment of the electrical machine 1 that has only one stator 5 provided with one or more windings 6 of conductor wires. The first rotor 12 and the second rotor 22 rotate respectively outside and inside the stator 5, the first and second rotors 12 and 22 having the same axis of rotation.

Unlike the preferred embodiment, the first rotor 12 has permanent magnets 15, while the second rotor 22 has non-permanent magnets 26 constituted for example by coils of conductor wires conveying DC delivered by a battery or by capacitors. Thus, the rotor 12 generates a first rotor magnetic field permanently, whereas the rotor 22 is capable of generating a second rotor magnetic field solely when the non-permanent magnets 26 are conveying DC.

Once more, first disengageable coupling means 30 comprise an intermediate shaft 51, the second coupling means 40, and third disengageable coupling means 35. The intermediate shaft 51 then constitutes one end of the outlet shaft 50, and the third coupling means 35 mechanically connect the first rotor 12 with this end of the outlet shaft 50. As a result, the first rotor 12 is mechanically connected to the outlet shaft when the third coupling means 35 are engaged, thereby enabling the first rotor 12 to be mechanically connected to the second rotor 22 via the second coupling means 40.

Advantageously, the use of non-permanent magnets 26 on the second rotor 22 makes it possible to eliminate magnetic torque completely by switching off the electrical power supply to the coils constituting the non-permanent magnets 26 in the event of the braking of the second rotor not being sufficient to disengage the second coupling means 40 during a short circuit.

Furthermore, the use of permanent magnets 15 on the first rotor 12 makes it possible to obtain better performance in motor mode, the third coupling means 35 serving to dissociate this first rotor 12 from the outlet shaft 50 in the event of the first rotor 12 braking, e.g. following a short circuit in the coils 6 of the stator 5.

Furthermore, the use of a single stator 5 for co-operating with the first rotor 12 and the second rotor 22 makes it possible to reduce the dimensions and the weight of the reversible electrical machine 1, and thus to reduce its cost.

Figure 4:
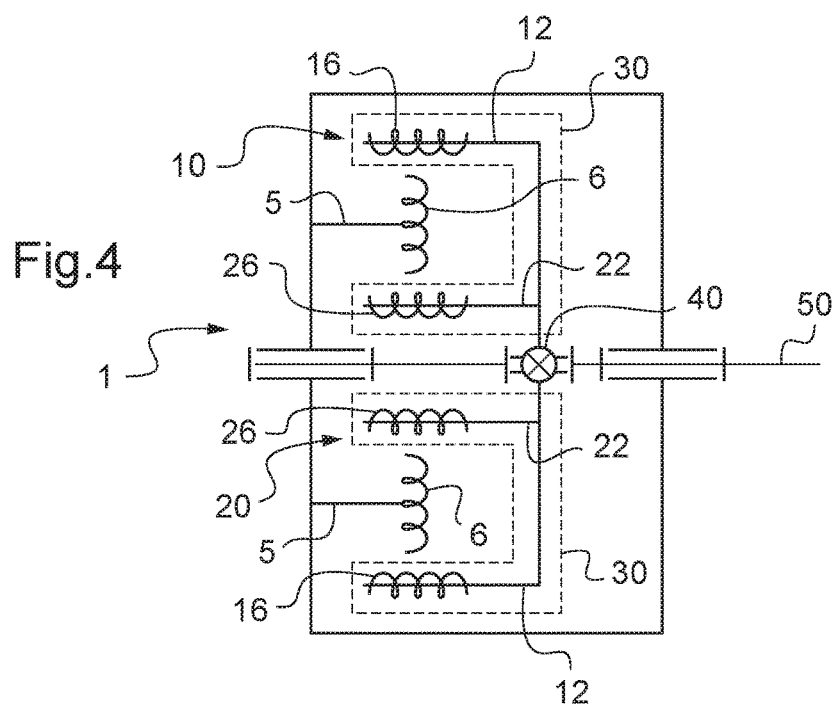

Another embodiment of the reversible electrical machine 1 is shown in FIG. 4. The reversible electrical machine 1 has a single stator 5, and the first rotor 12 is formed by non-permanent first magnets 16 such as coils powered with DC and rotating outside the stator 5, while the second rotor 22 is formed by non-permanent second magnets 26 such as coils powered by DC and rotating inside the stator 5. Furthermore, the non-permanent first and second magnets 16, 26 are mechanically constrained to rotate together permanently about the common axis of rotation of the first and second rotors 12, 22.

The first coupling means 30 then include inhibit means enabling the electrical power supply to the non-permanent first magnets 16 to be switched off, while the non-permanent second magnets 26 continue to be powered electrically. When the first coupling means 30 are engaged, the non-permanent first magnets 16 and the non-permanent second magnets 26 are powered with DC and they transmit torque to the first rotor 12 and to the second rotor 22 in motor mode. The first and second rotors 12, 22 thus rotate together about their axis of rotation and enable the electrical machine 1 to deliver maximum torque in motor mode.

In contrast, when the first coupling means 30 are disengaged, i.e. when the inhibit means switches off the electrical power supply to the non-permanent first magnets 16, only the non-permanent second magnets 26 of the second rotor 22 are powered with DC. Consequently, only the second rotor 22 creates a rotor magnetic field, and as a result rotates about its axis of rotation, thereby enabling the electrical machine 1 to deliver just enough electric power in generator mode.

Thus, this embodiment of the reversible electrical machine 1 makes it possible in particular to eliminate the third coupling means 35 of the preferred embodiment, thereby reducing the number of components of the reversible electrical machine 1, and consequently reducing its weight and its cost. Furthermore, this embodiment is particularly advantageous when the opposing torque created during a short circuit in the coil 6 of the stator 5 does not enable the second coupling means 40 to be disengaged under a first predetermined force.

However, since the non-permanent first magnets 16 and the non-permanent second magnets 26 are mechanically connected to rotate together on a continuous basis, blocking of the first or second electrical device 10, 20 causes the second coupling means 40 to be disengaged, and consequently causes the motor and generator functions of the reversible electrical machine 1 to be lost.

Figure 5:
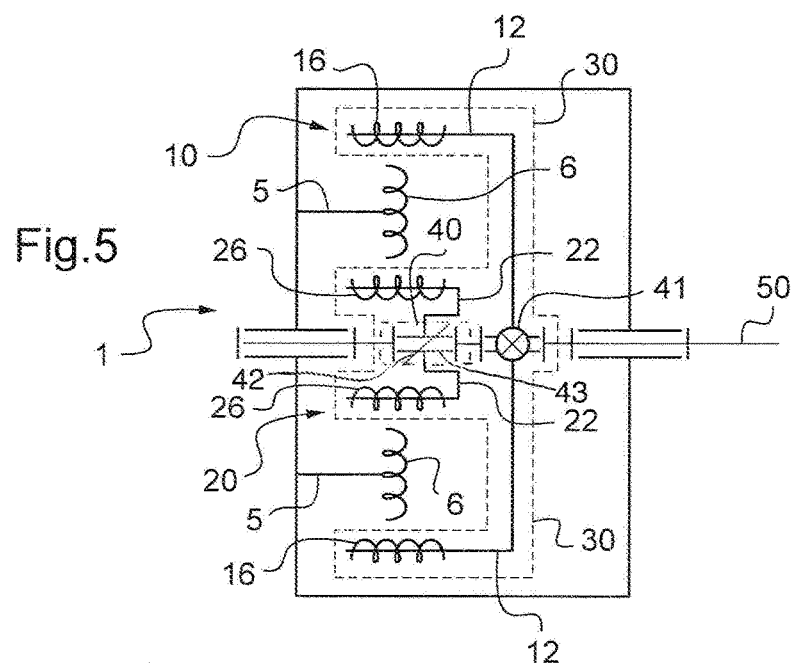

In a variant of this embodiment of the invention as shown in FIG. 5, the first coupling means 30 include not only the inhibit means, but also the second coupling means 40 and disengageable fourth coupling means 41. The normal operation of the reversible electrical machine 1 in this variant remains unchanged and is obtained in particular by using the inhibit means to switch on or off the electrical power supply to the non-permanent first magnets 16.

However, the non-permanent first and second magnets 16, 26 are not mechanically linked together in rotation on a permanent basis, being linked via the second and fourth coupling means 40, 41 which are disengageable, and by the outlet shaft 50.

These fourth coupling means 41 are disengageable under a second predetermined force, enabling the first rotor 12 to be dissociated from the outlet shaft 50 in the event of the first electrical device 10 becoming blocked. Thus, the reversible electrical machine 1 remains functional by means of the second device 20, which is connected to the outlet shaft 50 by the second coupling means 40.

Likewise, in the event of the second electrical device 20 becoming blocked, the second coupling means 40 enable the second rotor 22 to be dissociated from the outlet shaft 50. For example, the second coupling means 40 may include a fuse element 42 that connects the outlet shaft 50 to a bore 43 associated with the second motor 22, and the fuse element 42 may be configured to break under a first predetermined force in order to dissociate the bore 43 from the outlet shaft 50. The electrical machine 1 thus remains operational, in motor mode only, by using the first device 10, which is connected to the outlet shaft 50 by the fourth coupling means 41.

Advantageously, in the event of the first or the second electrical device 10, 20 becoming blocked, this variant thus makes it possible to maintain the reversible electrical machine 1 operational, at least in part.

Furthermore, the reversible electrical machine 1 of the invention may be used in various types of vehicle. The reversible electrical machine 1 is preferably used in an aircraft 100 having a rotary wing. Such an aircraft 100 is shown in FIGS. 6 and 7 and includes a hybrid power plant 105 and at least one main rotor 102.

This hybrid power plant 105 comprises at least one engine 103, at least one reversible electrical machine 1 as described above, and a main gearbox (MGB) 101 that is connected to the main rotor 102 of the aircraft 100.

Figure 6:
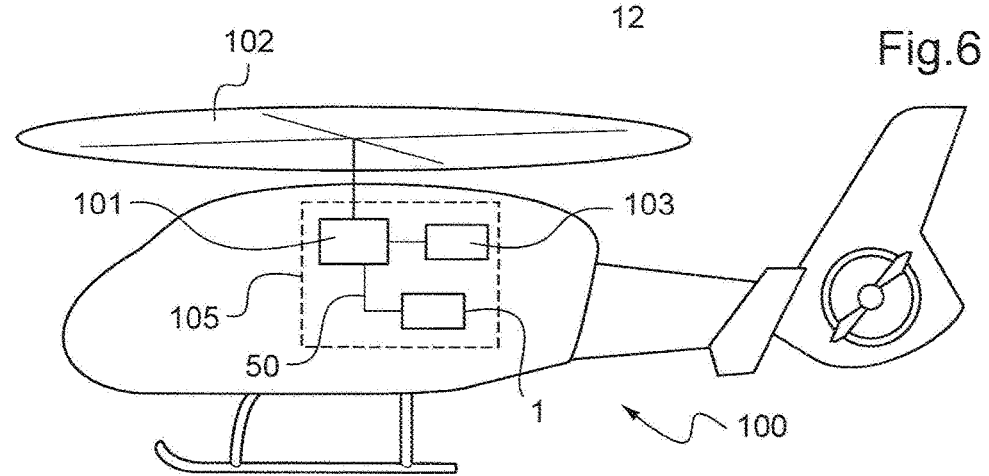
FIG. 6 shows a rotary wing aircraft fitted with parallel hybridization with a reversible electrical machine.

With parallel hybridization, as shown in FIG. 6, the outlet shaft 50 from the reversible electrical machine 1 is mechanically connected to the MGB 101.

Figure 7:
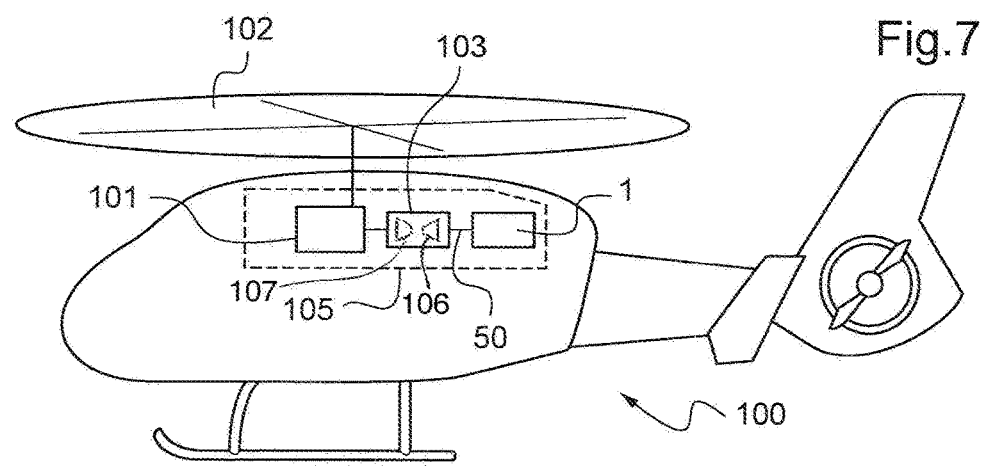
FIG. 7 shows a rotary wing aircraft fitted with micro-hybridization with a reversible electrical machine.

With micro-hybridization, as shown in FIG. 7, the outlet shaft 50 from the reversible electrical machine 1 is mechanically connected to the engine 103, and more precisely to the compressor 106 of the engine 103. The engine 103 also has a free turbine 107 that is mechanically connected to the MGB 101.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A reversible electrical machine comprising:
   a first electrical device having a first rotor configured to cooperate with a first stator;
   a second electrical device including a second rotor configured to cooperate with a second stator;
   first disengageable coupling means enabling the first and second rotors to be associated and dissociated in rotation; and an outlet shaft;
wherein the reversible electrical machine includes second disengageable coupling means that are disengageable under a first predetermined force and that mechanically connect the second rotor to the outlet shaft, the first electrical device being a motor for transmitting mechanical power to the outlet shaft and the second electrical device being a motor-generator for operating in motor mode to transmit additional mechanical power to the outlet shaft, and in generator mode for receiving mechanical power from the outlet shaft.

2. The reversible electrical machine according to claim 1 wherein the first rotor includes first magnets that are permanent.

3. The reversible electrical machine according to claim 1 wherein the second rotor includes second magnets that are permanent.

4. The reversible electrical machine according to claim 1 wherein the first rotor includes first magnets that are non-permanent.

5. The reversible electrical machine according to claim 1 wherein the second rotor includes second magnets that are non-permanent.

6. A reversible electrical machine comprising:
a first electrical device having a first rotor configured to cooperate with a first stator;
a second electrical device including a second rotor configured to cooperate with a second stator;
first disengageable coupling means enabling the first and second rotors to be associated and dissociated in rotation;
an outlet shaft; and
second disengageable coupling means that are disengageable under a first predetermined force and that mechanically connect the second rotor to the outlet shaft;
wherein the first electrical device is a motor for transmitting mechanical power to the outlet shaft and the second electrical device is a motor-generator for operating in motor mode to transmit additional mechanical power to the outlet shaft, and in generator mode for receiving mechanical power from the outlet shaft, and wherein the first rotor and the second rotor are rotatable about a common axis of rotation and the first coupling means include an intermediate shaft, the second coupling means, and third disengageable coupling means mechanically connecting the first rotor to the intermediate shaft, the intermediate shaft being associated with the outlet shaft, thereby enabling the first rotor to be mechanically connected to the second rotor.

7. The reversible electrical machine according to claim 6 wherein the third coupling means include a freewheel enabling the first rotor to be associated with the intermediate shaft, and consequently with the second rotor, in one direction of rotation, and to be dissociated from the intermediate shaft, and consequently from the second rotor in the opposite direction of rotation, the second coupling means being engaged.

8. The reversible electrical machine according to claim 7 wherein the intermediate shaft constitutes one end of the outlet shaft.

9. The reversible electrical machine according to claim 5 wherein the first rotor is formed by DC-powered non-permanent first magnets and the second rotor is formed by DC-powered non-permanent second magnets, the non-permanent first and second magnets being mechanically connected together in rotation, the first coupling means including inhibit means enabling the power supply to the non-permanent first magnets to be switched off while the non-permanent second magnets continue to be powered.

10. The reversible electrical machine according to claim 9 wherein the first coupling means include the second coupling means and fourth disengageable coupling means that are disengageable under a second predetermined force and that mechanically connect the first rotor with the outlet shaft, the second coupling means and the fourth coupling means thus enabling the first rotor and the second rotor to be mechanically coupled together in rotation by the outlet shaft.

11. The reversible electrical machine according to claim 2 wherein the first magnets of the first rotor rotate outside the first stator.

12. The reversible electrical machine according to claim 3 wherein the second magnets of the second rotor rotate inside the second stator.

13. The reversible electrical machine according to claim 1 wherein the first and second rotors rotate about a common axis of rotation, and the first and second stators form a single stator.

14. The reversible electrical machine according to claim 1 wherein at least one first magnet is oriented radially relative to the axis of rotation of the first rotor and at least one second magnet is oriented radially relative to the axis of rotation of the second rotor.

15. The reversible electrical machine according to claim 1 wherein the first motor includes multiple first magnets, and the second motor includes multiple second magnets, and wherein at least one first magnet is oriented radially relative to an axis of rotation of the first rotor and at least one second magnet is oriented radially relative to an axis of rotation of the second rotor.

16. A hybrid power plant of a rotary wing aircraft wherein the hybrid power plant includes a main gearbox connected to a main rotor of the aircraft, at least one engine mechanically connected to the main gearbox, and at least one reversible electrical machine according to claim 1 with the outlet shaft being mechanically connected to the main gearbox.

17. A hybrid power plant of a rotary wing aircraft wherein the hybrid power plant comprises a main gearbox connected to a main rotor of the aircraft, an engine having a free turbine and a compressor, together with at least one reversible electrical machine according to claim 1, with the outlet shaft being mechanically connected to the compressor of the engine, and the free turbine of the engine being mechanically connected to the main gearbox.

18. The reversible electrical machine according to claim 1 wherein the second disengageable coupling means are automatically disengageable under the first predetermined force.

19. The reversible electrical machine according to claim 1 wherein the first coupling means is configured to connect the first and second rotors with a first transmission ratio, and the second coupling means is configured to connect the second rotor to the outlet shaft with the first transmission ratio.

20. The reversible electrical machine according to claim 19 wherein the first transmission ratio is equal to 1.

* * * * *